United States Patent [19]
Johnston

[11] 4,428,239
[45] Jan. 31, 1984

[54] DIFFERENTIAL PRESSURE MEASURING APPARATUS

[75] Inventor: James S. Johnston, Bognor Regis, England

[73] Assignee: Rosemount Engineering Company Limited, England

[21] Appl. No.: 314,851

[22] Filed: Oct. 26, 1981

[30] Foreign Application Priority Data

Oct. 27, 1980 [GB] United Kingdom ............... 8034483

[51] Int. Cl.³ .............................................. G01L 9/00
[52] U.S. Cl. ...................................... 73/705; 356/358
[58] Field of Search ........................... 73/705; 356/358

[56] References Cited

U.S. PATENT DOCUMENTS 2,591,666  4/1952  Barkas et al. ..................... 356/358

FOREIGN PATENT DOCUMENTS 13974     6/1980  European Pat. Off. .
1168971  10/1969  United Kingdom .
1318780  10/1970  United Kingdom .

*Primary Examiner*—Donald O. Woodiel
*Attorney, Agent, or Firm*—Kinney, Lange, Braddock, Westman and Fairbairn

[57] ABSTRACT

A differential pressure transducer of the diaphragm displacement type uses optical techniques to measure disphragm displacement. White light from a source is conducted by optical fibres to the transducer and interference is produced between light reflected at a thickened region of the diaphragm and a partially reflecting end face of the light conductor which is lapped flat and parallel to the diaphragm surface. The interfering reflected light is conducted back to a prism where it is dispersed onto photo-arrays. The wavelengths of dark fringes in the spectrum are measured to determine the displacement of the diaphragm. Measurements can be made on both sides of the diaphragm and used to eliminate dependence on reflective index.

18 Claims, 4 Drawing Figures

DIFFERENTIAL PRESSURE MEASURING APPARATUS

BACKGROUND OF THE INVENTION

The present invention is concerned with apparatus for measuring differential pressure. A common known form of transducer for this purpose comprises a body with a flexible diaphragm mounted in the body and arranged to be deflected or displaced relative to the body by the differential pressure to be measured applied across the diaphragm. The amount of displacement of the diaphragm is indicative of the pressure difference. Hitherto, a common method of determining the displacement of the diaphragm employs capacitative techniques whereby the diaphragm forms a movable plate of a capacitor. An example of a capacitative differential pressure transducer is described in British Patent Specification No. 1,318,780.

It is also known to use optical techniques for measuring very small displacements. In such known optical techniques, typically a monochromatic light is used to set up interference fringes resulting from reflection from two non-parallel surfaces. The spacing of the interference fringes can be used to determine the angle between the two surfaces and movement of the fringes is indicative of displacement of one surface relative to the other. Such conventional monochromatic interferometry is not capable of giving an absolute measurement of the distance between the two surfaces. The published specification of European Patent Application No. 80100313 (Publication No. 0013974) discloses the use of a Fabrey-Perot interferometer to measure small distances. In the disclosed arrangement, white light is transmitted via optical fibres across a spacing between two accurately parallel partially reflecting surfaces. It is said that only those particular wavelengths of the light that are equal to the half wavelength multiples of the Fabrey-Perot sensor gap widths are transmitted on to a detector arrangement. The detector disperses the transmitted light by means of a prism onto an array of photo detectors so that the wavelengths of peaks in the transmission spectrum can be determined. In this way the spacing between the reflecting surfaces of the interferometer can be calculated uniquely.

The specification of the British Pat. No. 1,168,971 also discloses a Fabrey-Perot interferometer arrangement for measuring the distance between parallel partially reflecting surfaces. In this arrangement the light illuminating the interferometer is monochromatic but its frequency is swept between a first and second frequency. As the frequency is changed, the interference fringe pattern produced in the interferometer changes correspondingly and the distance between the surfaces can be determined by counting the number of changes produced in the fringe pattern at the position of a single photocell.

Neither of the arrangements disclosed in the above mentioned European Publication No. 0013974 and British Patent No. 1,168,971 can be applied to a differential pressure transducer of the moving diaphragm type.

SUMMARY OF THE INVENTION

According to the present invention, apparatus for measuring differential pressure comprises a transducer having a body and a diaphragm mounted in the body to be displaced relative to the body by a differential pressure to be measured applied across the diaphragm so that the displacement is indicative of the pressure difference, and means for measuring the displacement of the diaphragm, wherein at least a surface region of the diaphragm is reflective and the means for measuring comprises a partially reflecting surface fixed relative to the body adjacent said surface region of the diaphragm to form therewith an interferometer arrangement, means for directing light towards the region of the diaphragm through the partially reflecting surface to illuminate the interferometer arrangement to produce interference between the light reflected by the diaphragm and the light reflected by the partially reflected surface, the illuminating light having either a predetermined continuous band of frequencies or a single frequency which is periodically swept through said band, detector means arranged to be responsive to said interfering reflected light to provide an output indication of the amplitude variation with the frequency of the interfering reflected light within said band of frequencies, and means for processing said output indication to provide an indication of said diaphragm displacement.

This arrangement is capable of providing an absolute measure of the distance between the reflecting surface region of the diaphragm and the partially reflecting surface fixed in the body of the transducer. In this way by suitably calibrating the apparatus, the differential pressure across the diaphragm can be determined. It will be appreciated that interference occurs between the light reflected by the diaphragm and re-emerging through the partially reflecting surface and light reflected initially in the partially reflecting surface. Normally, destructive interference occurs in the interfering reflected light if the space in between the partially reflecting surface and the reflected surfaces of the diaphragm is a multiple of half wavelengths of the light.

Normally, only a predetermined confined part of said surface region of the diaphragm is illuminated together with a corresponding confined part of the partially reflecting surface. At least said confined parts of said surfaces are desirably parallel to one another and arranged perpendicular to the direction of incidence of the illuminating light.

In a suitable arrangement of the apparatus, destructive interference can take place at two or more frequencies in the predetermined band of frequencies. For example, if destructive interference takes place at a pair of adjacent wavelengths $\lambda_0$ and $\lambda_1$ the distance d between the surfaces can be expressed by:

$$d = \frac{\lambda_0}{2} n \text{ and } d = \frac{\lambda_1}{2}(n+1)$$

where n is a whole number. Thus, $$d = \frac{1}{2} \cdot \frac{\lambda_0 \lambda_1}{\lambda_0 - \lambda_1}$$

Preferably, the means for directing is arranged to produce a beam of energy in which:

$$\frac{\lambda_L \lambda_S}{2(\lambda_L - \lambda_S)} < d_{min}$$

where $\lambda_L$ is the longest wavelength and $\lambda_S$ is the shortest wavelength of the energy in the band, and $d_{min}$ is the minimum distance to be measured. The above preferred arrangement ensures that there at least one pair of adjacent wavelengths of the energy at which destructive interference takes place. Then, the processing means may be arranged to determine the frequencies of at least two selected minima or maxima in said variation of amplitude of light with frequency across the band of frequencies and to count the number of minima or maxima between these selected minima or maxima and therefrom to calculate a value for said diaphragm displacement. The value for diaphragm displacement can readily be calculated by the processing means using the above referred equation.

The said processing means may be arranged to determine the frequencies of more than two said minima or maxima and to calculate values for said displacement from each pair of frequencies and the number of minima or maxima between the respective pair of minima or maxima. Then, a number of values for the displacement is calculated enabling a mean value for the displacement to be calculated with improved accuracy.

In a preferred arrangement said detector means includes fibre optic means for conducting said interfering reflected light to a location remote from the transducer for provision of said output indication. Said means for directing may include a source of light also remote from the transducer and fibre optic means may be provided for conducting light from the source to the transducer to illuminate said interferometer arrangement. With such an arrangement, the only connection to the transducer may be via such fibre optic means.

The said fibre optic means of both said detector means and said means for directing may have a common termination at the transducer formed as said partially reflecting surface. In one arrangement, said detector means and said means for directing may have a common fibre optic means for conducting light from said source to the transducer and interfering reflected light back from the transducer, the apparatus then including a beam splitter at the end of the fibre optic means remote from the transducer to separate out the interfering reflected light from the transducer for detection of said amplitude variation with frequency. In a different arrangement, said detector means and said means for directing may comprise separate bundles of optical fibres which are intermingled to form said common termination at the transducer.

In one embodiment, said means for directing is arranged to produce light with a single frequency which is periodically swept through said band and said detector means may then comprise a photo-detector located to be responsive to the amplitude of the interfering reflected light to provide an output signal which varies with time as the light frequency is swept through said band.

In a different embodiment, said means for directing is arranged to produce light having said continuous band of frequencies, and then said detector means may have a light disperser to disperse spacially the constituent frequencies of the interfering reflected light into a spectrum and light intensity detecting means located to be illuminated by the dispersed light spectrum and arranged to provide an indication of variations in the light intensity against frequency across the spectrum. The light intensity detecting means may comprise an array of photo-detectors located across the spectrum. Alternatively, the light intensity detecting means may comprise a television camera tube.

It will be appreciated that the light source used in the apparatus described above may not have a constant intensity across said frequency band. Preferably, then, the apparatus includes means for selectively illuminating said detector means with light directly from the source to provide an output indication of the amplitude variation with frequency of the source light. The processing means may then be arranged to log said variation of the source light for use in compensating for the affect of such variation superimposed on the variation due to interference in the interferometer arrangement.

Preferably, the reflective surface region of the diaphragm of the transducer is made to be stiff relative to the rest of the diaphragm so that the surface region deforms insignificantly on flexure of the diaphragm.

In a particular arrangement, corresponding surface regions on both sides of the diaphragm are reflective and there is a second plurality reflecting surface on the opposite side of the diaphragm forming a second interferometer arrangement, said means for directing light being arranged also to illuminate said second interferometer arrangement and said detector means being arranged to be responsive also to interfering reflected light from said second interferometer arrangement to provide a second said output indication of amplitude variation with frequency, said means for processing receiving both said first mentioned and second output indications and providing therefrom an indication of said diaphragm displacement which is substantially independent of variations in the refractive index of the medium filling the spacings between the reflective and partially reflecting surfaces of the interferometer arrangements.

Examples of the present invention will now be described with reference to the accompanying drawings.

DETAILED DESCRIPTION OF THE PREFERRED EMBODIMENTS

Figure 1:
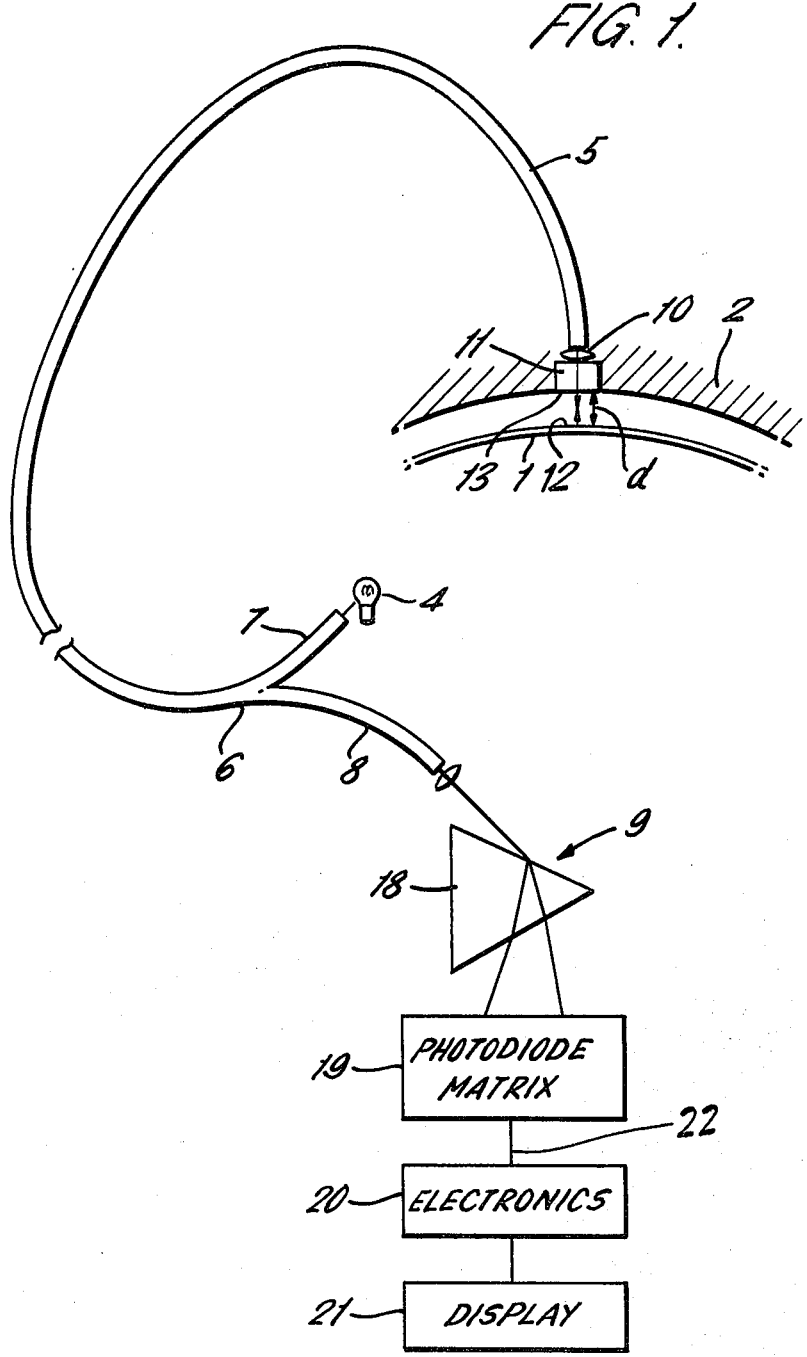
FIG. 1 illustrates, rather schematically, an example of the invention with the differential pressure transducer shown only in part.

Referring firstly to FIG. 1, apparatus is illustrated for measuring the distance d between a point on one surface of the diaphragm of a differential pressure transducer and the adjacent surface of the body or housing of the transducer. In FIG. 1, only a part of the diaphragm 1 and a part of the body 2 of the transducer are illustrated for clarity. Differential pressure transducers of the general kind under consideration are well known, for example in the aforementioned British Pat. No. 1,318,780. In such known pressure transducers, the diaphragm is mounted in a housing so as to divide in two parts a chamber filled with a pressure transmitting medium, typically an oil. The pressures of which the difference is to be measured by the transducer are applied by know techniques to the fluid on opposite sides of the diaphragm so that the diaphragm is deflected in response to the difference between the pressures. As is well known, the differential pressure can be measured by determining the amount of deflection or displacement of the diaphragm. One of the problems with differential pressure transducers of this general kind is accurately to measure this diaphragm displacement. It will be appreciated that the displacement of the diaphragm 1 in the present example can be determined by measuring the distance d as illustrated in FIG. 1.

In FIG. 1, white light from a source 4, typically an incandescent bulb, is conducted to the pressure transducer from a remote location along a light conductor 5. Light emerging from the conductor 5 at the transducer is focused by a lens system 10 through a transparent reference plate 11 onto a surface 12 of the diaphragm 1. A face 13 of the reference plate 11 is lapped optically flat and parallel to the tangent to the surface 12 of the diaphragm 1 immediately adjacent the plate 11. The surface 12 of the diaphragm 1 at least immediately opposite the plate 11 is rendered reflecting and the surface 13 of the plate is also made partially reflecting. As a result, light reflected by the surface 12 of the diaphragm 1 and re-entering the plate 13 interferes with the light reflected initially at the partially reflecting surface 13 of the plate. The interfering reflected light then retraces the original optical path back into the light conductor 5. The conductor 5 comprises two bundles 7 and 8 of optical fibres which are substantially evenly intermixed over the major length of the conductor 5 but fork at 6, one bundle 7 leading to the light source 4 and a second bundle 8 leading to an optical system indicated generally at 9. It will be appreciated that a portion of the reflected interfering light re-entering the optical conductor 5 enters fibres of the bundle 8 and is conducted by the bundle 8 to the optical system 9. The optical system 9 comprises a prism 18 which disperses the various frequency components of the reflected interfering light. A matrix or array 19 of photo-detectors is located to be illuminated by the spectrum of light from the prism 18 so that the relative intensity or amplitude of the returning light at different frequencies can be selectively measured by the matrix 19.

It will be appreciated that destructive interference occurs between the light reflected from the diaphragm surface 12 and light reflected in the partially reflected surface 13 at frequencies where the spacing d between the surfaces is a multiple of half wavelengths. Thus, the spectrum of light dispersed onto the array 19 includes bright and dark fringes at positions along the spectrum corresponding to those wavelengths of light at which destructive interference occurred in the gap between the surfaces 12 and 13.

Means (not shown) may be provided to scan the array 19 of photo-detectors to give a sequential output on a line 22 which is indicative of the relative light intensities across the spectrum. It will be appreciated that the location of each element of the array 19 relative to the frequencies of the spectrum can be predetermined so that, by knowing the positions of the various elements of the array, the wavelengths of any dark fringes in the spectrum can readily be determined.

The sequential output of the array of photo-detectors is fed to an electronics unit 20 in which the wavelengths of dark fringes are calculated and from these wavelengths the spacing d is also calculated. The result is supplied to a display 21.

If the distance d is such that adjacent dark fringes across the spectrum illuminating the array 19 are observed at wavelengths $\lambda_0$ and $\lambda_1$, it can be said that there are a whole number, n, of half wavelengths $\lambda_0$ between the surfaces 14 and 15 of the two plates, and also a whole number, n+1, of half wavelengths $\lambda_1$. As explained previously, this leads to the relationship $$d = \frac{1}{2} \frac{\lambda_0 \lambda_1}{\lambda_0 - \lambda_1}.$$

The electronics unit 20 can be arranged to determine values for $\lambda_0$ and $\lambda_1$ and therefrom calculate the value for d for display on the display 21.

In practice, a large number of fringes will be detected across the spectrum and the precision of determining the distance d may be improved by considering more widely spaced fringes. Thus, if the wavelength of a particular fringe and the mth fringe from it are determined, then $$d = \frac{1}{2} \cdot \frac{m \lambda_0 \lambda_m}{\mu(\lambda_0 - \lambda_m)},$$

where $\lambda$ is taken to be the wavelength in free space and $\mu$ is the refractive index of the material or medium between the plates 1 and 2.

A number of expressions such as the above can be produced for various pairs of the fringes detected. Thus, for best precision, the electronics unit 20 is arranged to calculate a value for d using as many pairs of fringes as possible and then providing an optimised means value for d.

In the arrangement illustrated in FIG. 1, only a small region of the surface 12 of the diaphragm 1 is illuminated by the light transmitted from the source 4 along the optical conductor 5. Provided this illuminated region is sufficiently small and the light beam is directed towards the surface 12 accurately perpendicular to the tangent to the surface 12 at the illuminated spot, then minor deviations of the surface 13 from a planar surface need not be important. It is only important that the illuminated region of the surface 12 does not deviate from a surface perpendicular to the beam of light and parallel to the partially reflective surface 13 of the reference plate 11 by more than a small fraction of the shortest wavelength of light in the beam. The amount of deviation should certainly be less than one quarter of the shortest wavelength.

Figure 2:
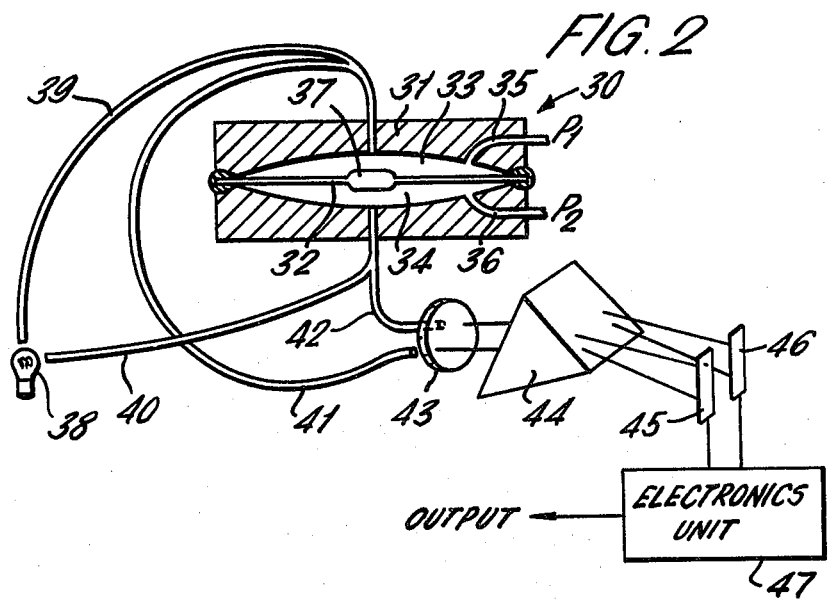
FIG. 2 illustrates a further example of the invention which the displacement of the diaphragm is measured simultaneously from both sides.

Referring now to FIG. 2, a modified arrangement is illustrated in which the distance to the diaphragm is measured from both sides. In FIG. 2, a differential pressure transducer is illustrated generally at 30 and comprises a body 31 in which is mounted a diaphragm 32. The diaphragm 32 is normally circular and mounted about its periphery so as to divide a pressure chamber in the body 31 into two parts 33 and 34. The parts 33 and 34 of the pressure chamber are filled with a pressure transmitting fluid typically oil and the pressures $P_1$ and $P_2$ of which the difference is to be measured by the transducer is communicated to respective parts 33 and 34 of the chamber along channels 35 and 36 through the body 31. As a result of a difference between the pressures $P_1$ and $P_2$, the diaphragm 32 is deflected from its median position. The structure of the pressure transducer described so far is typical of known transducers.

In the present illustrated example of the present invention, however, the deflection or displacement of the diaphragm 34 is measured by optical means. A central region 37 of the diaphragm is made slightly thicker than the rest of the diaphragm so as to be relatively stiff. The surfaces of the thickened central region 37 are accurately flat and reflecting and remain substantially flat on deflection of the diaphragm 32 in response to a differential pressure. As with the example of the invention illustrated in FIG. 1, light is conducted from a source 38 along optical conductors 39 and 40 to the transducers 30 from a remote location. In the present example, the optical conductors 39 and 40 extend right through the body 31 and are terminated immediately opposite the stiffened central region 37 of the diaphragm. In the present example, light is conducted by the conductors 39 and 40 to both sides of the diaphragm 32. The ends of the light conductors opposite the surfaces of the diaphragm 32 are lapped optically flat and are coated by sputtering or evaporation with a partially reflecting coating. Thus, gaps producing interferometer arrangements are provided on both sides of the diaphragm 32 so that there is interference between light reflected from the diaphragm and directly back along the conductor 39 by the partially reflecting coatings.

As in the previously described example, the light conductors at least at the terminations at the transducer 30 are formed of two bundles of optical fibres intermixed. Part of the reflected interfering light is thus transmitted by the bundles 41 and 42 from either side of the diaphragm 32 to a detecting and processing arrangement for determining the deflection of the diaphragm.

The light from each bundle 41 and 42 of fibres is focused through a lens 43 and dispersed by a prism 44 into separate spectra illuminating respective detector arrays 45 and 46. The wavelengths in the two spectra of dark fringes can then be determined by an electronics unit 47 receiving the output signals from the detectors 45 and 46.

The electronics unit 47 may be arranged to employ the two sets of output signals corresponding to the interference patterns on opposite sides of the diaphragm 32 to calculate the differential pressure with greater accuracy and also so as to be substantially independent of variations in the reflective index of the medium filling the parts 33 and 34 of the pressure chamber in the pressure transducer.

If the distances measured on opposite sides of the diaphragm 32 are $d_1$ and $d_2$, then the displacement of the diaphragm from its median position is $d_1 - d_2$.

The electronics unit 47 may be arranged to calculate $d_1 - d_2$ and also to calculate the $d_1 + d_2$ which should be independent of the deflection of the diaphragm, i.e. of the differential pressure. However, both quantities are dependent on the reflective index $\mu$ of the medium filling the pressure chamber of the transducer. Therefore, if the electronics unit 47 is arranged to divide the value for $d_1 - d_2$ by the value for $d_1 + d_2$, a resulting value can be obtained which is indicative of the differential pressure but independent of variations in the refractive index $\mu$.

Instead of the optical arrangement shown in FIG. 2, the two spectra from opposite sides of the diaphragm 32 can be focused onto a single array of photo-detectors. Then, separate light sources can be used instead of the single source 38 and the two readings from opposite sides of the diaphragm can be taken successively at the single detector array by successively switching on and off the two light sources. In a further arrangement, a single light source and a single array can be used together with a suitable electro-optical or electromechanical device arranged to deflect only one of the two spectra onto the detector at a time.

Figure 3:
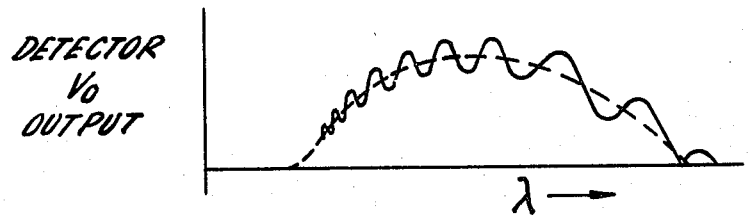
FIG. 3 is a graphical illustration of the variation with frequency of the output signals of the detectors of the FIG. 2 example and FIG. 4 is a graphical illustration of the normalising effect achieved in the electronic processing unit of the example of FIG. 3 when the output signal is compared with that generated by light directly from the source.
Figure 4:
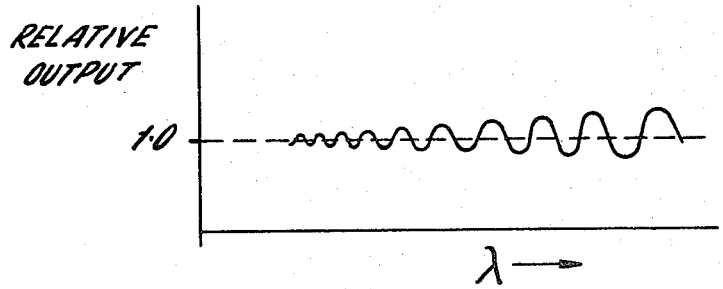

FIG. 3 demonstrates a typical spectrum as detected by one of the arrays 45 and 46. The maxima and minima caused by interference are superimposed on the spectral distribution curve of the light as emitted by the source 38. The electronics unit 47 may be arranged to locate the positions of the minima or maxima in such a spectrum by storing signals representing the complete spectrum and then sampling the spectrum and looking for turning points. Also, it may be convenient to compensate for the inherent spectral content of the light from the source 38. This may be achieved by conducting some light from the light source 38 directly to the prism 44 and onto the detector arrays 45 and 46 so that the electronics unit 47 can log data defining the spectral content of the light from the source as measured by each of the detector arrays 45 and 46. If the interference patterns from the transducer are subsequentally recorded and logged in the electronics unit, signals representing light intensity at each wavelength can be multiplied by the reciprocal of the stored signal for the same wavelength of light directly from the light source. The resulting combined compensated data would define a wave form as illustrated in FIG. 4 with the interference fringes normalised about the value 1. Then, the electronics unit 47 may be arranged to determine the wavelengths of maxima or minima by seeking the points midway between where the wave form illustrated in FIG. 4 crosses the horizontal line at value 1. It will be appreciated that this latter technique is also effective to compensate for differing sensitivities of individual diodes in the arrays 45 and 46.

Although separate bundles of fibres are illustrated conducting light to and from the transducer, a single light conductor could be used together with suitable half silvered mirror or beam splitter arrangements for separating the returning reflected light for detection.

Although the above described examples have employed a source of white light, similar advantages of the present invention can be achieved using a single frequency light source as the light source 4 or 38, which is swept periodically across a predetermined band of frequencies. Then, a spacially distributed detection arrangement, such as photo-diode arrays 19, 45 and 46 is unnecessary provided the frequency of the beam is swept in a predetermined manner. Then a single detector of the amplitude of the interfering reflected light may be provided and variation of the detector output with time is indicative of amplitude variation with frequency. The swept frequency light source may comprise a tunable laser, or alternatively a moving prism or refraction grating. With a swept frequency light source, the prisms 18 and 44 can be dispensed with and the detectors may comprise a single photo-diode.

In yet another arrangement using white light, the detector arrangement may have a tunable filter which is swept periodically through the band. This again permits a single detecting device to be used for detecting amplitude variation with frequency. The tunable filter may comprise a refraction grating or prism which is mechanically rotated to sweep the spectrum across the detector, or a crystal having a voltage dependent refractive index.

In each arrangement of means for directing light during a measurement period a multiplicity of predetermined light frequencies are provided by the light source, either as a continuous band of frequencies, or a single frequency light swept through the band.

What is claimed is:

1. Apparatus for measuring differential pressure comprising a transducer having a body and a diaphragm mounted in the body to be displaced relative to the body by a differential pressure to be measured applied across the diaphragm so that the displacement is indicative of the pressure difference, and means for measuring the displacement of the diaphragm, wherein at least a surface region of the diaphragm is reflective and the means for measuring comprises a partially reflecting surface fixed relative to the body adjacent said surface region of the diaphragm to form therewith an interferometer arrangement, means for directing light towards said region of the diaphragm through the partially reflecting surface to illuminate the interferometer arrangement to produce interference between the light reflected by the diaphragm and the light reflected by the partially reflective surface during a measurement period, the illuminating light having a multiplicity of predetermined frequencies during the measurement period comprising a band of frequencies, detector means arranged to be responsive to said interfering reflected light to provide an output indication of the amplitude variation with frequency of the interfering reflected light within said band of frequencies.

2. Apparatus as claimed in claim 1 wherein said means for directing is arranged to illuminate only a predetermined confined part of said surface region of the diaphragm and a corresponding confined part of the partially reflecting surface, and said confined parts of said surfaces are parallel to one another and perpendicular to the direction of incidence of the illuminating light.

3. Apparatus as claimed in claim 2 wherein said means for directing is arranged to direct light in which $$\frac{\lambda_L \lambda_S}{2(\lambda_L - \lambda_S)} < d_{min},$$

where $\lambda_L$ is the longest wavelength and $\lambda_S$ is the shortest wavelength of light in said band, and $d_{min}$ is the minimum distance to be measured.

4. Apparatus as claimed in claim 3 wherein said processing means is arranged to determine the frequencies of at least two selected minima or maxima in said variation of amplitude of light with frequency across the band of frequencies and to count the number of minima or maxima between these selected minima or maxima and therefrom to calculate a value for said diaphragm displacement.

5. Apparatus as claimed in claim 4 wherein said processing means is arranged to determine the frequencies of more than two said minima or maxima and to calculate values for said displacement from each pair of frequencies and the number of minima or maxima between the respective pair of minima or maxima.

6. Apparatus as claimed in claim 1 wherein said detector means includes fibre optic means for conducting said interfering reflected light to a location remote from the transducer for provision of said output indication.

7. Apparatus as claimed in claim 6 wherein said means for directing includes a source of light remote from the transducer and fibre optic means for conducting light from the source to the transducer to illuminate said interferometer arrangement.

8. Apparatus as claimed in claim 7 wherein said fibre optic means of both said detector means and said means for directing have a common termination at the transducer formed as said partially reflecting surface.

9. Apparatus as claimed in claim 8 wherein said detector means and said means for directing have a common fibre optic means for conducting light from said source to the transducer and interfering reflected light back from the transducer, the apparatus including a beam splitter at the end of the fibre optic means remote from the transducer to separate out the interfering reflected light from the transducer for detection of said amplitude variation with frequency.

10. Apparatus as claimed in claim 8 wherein said detector means and said means for directing comprise separate bundles of optical fibres which are intermingled to form said common termination at the transducer.

11. Apparatus as claimed in claim 1 wherein said means for directing is arranged to produce light with a single frequency which is periodically swept through said band and said detector means comprises a photodetector located to be responsive to the amplitude of the interfering reflected light to provide an output signal which varies with time as the light frequency is swept through said band.

12. Apparatus as claimed in claim 1 wherein said means for directing comprises a light source continuously producing light having said band of frequencies, and said detector means has a light disperser to disperse spacially the constituent frequencies of the interfering reflected light into a spectrum, and light intensity detecting means located to be illuminated by the dispersed light spectrum and arranged to provide an indication of variations in the light intensity against frequency across the spectrum.

13. Apparatus as claimed in claim 12 wherein the light intensity detecting means comprises an array of photo-detectors located across the spectrum.

14. Apparatus as claimed in claim 12 wherein the light intensity detecting means is a television camera tube.

15. Apparatus as claimed in claim 1 wherein said means for directing includes a light source, the apparatus including means for selectively illuminating said detector means with light directly from the source to provide an output indication of the amplitude variation with frequency of the source light and said means for processing being arranged to log said variation of the source light for use in compensating for the effect of such variation superimposed on the variation due to interference in the interferometer arrangement.

16. Apparatus as claimed in claim 1 wherein said surface region of the diaphragm is made to be stiff relative to the rest of the diaphragm.

17. Apparatus as claimed in claim 1 wherein corresponding surface regions on both sides of the diaphragm are reflective and there is a second partially reflecting surface on the opposite side of the diaphragm forming a second interferometer arrangement, said means for directing light being arranged also to illuminate said second interferometer arrangement and said detector means being arranged to be responsive also to interfering reflected light from said second interferometer arrangement to provide a second said output indication of amplitude variation with frequency, said means for processing receiving both said first mentioned and second output indications and to provide therefrom an indication of said diaphragm displacement which is substantially independent of variations in the refractive index of the medium filling the spacings between the reflective and partially reflecting surfaces of the interferometer arrangements.

18. Apparatus for measuring differential pressure comprising a transducer having a body and a diaphragm mounted in the body to be displaced relative to the body by a differential pressure to be measured applied across the diaphragm so that the displacement is indicative of the pressure difference, and means for measuring the displacement of the diaphragm, wherein at least a surface region of the diaphragm is reflective and the means for measuring comprises a partially reflecting surface fixed relative to the body adjacent said surface region of the diaphragm to form therewith an interferometer arrangement, means for directing light towards said region of the diaphragm through the partially reflecting surface to illuminate the interferometer arrangement to produce interference between the light reflected by the diaphragm and the light reflected by the partially reflective surface, said means for directing light comprising a light source selected from a group consisting of a source emitting light having a predetermined continuous band of frequencies and a light source emitting light at a single frequency which is swept periodically across the band of frequencies, and detector means arranged to be responsive to said interfering reflected light to provide an output indication of the amplitude variation with frequency of the interfering reflected light within said band of frequencies.

* * * * *